US011430176B2

(12) United States Patent
Levanony et al.

(10) Patent No.: US 11,430,176 B2
(45) Date of Patent: Aug. 30, 2022

(54) GENERATING VOLUME PREDICTIONS OF THREE-DIMENSIONAL VOLUMES USING SLICE FEATURES

(71) Applicant: International Business Machines Corporation, Armonk, NY (US)

(72) Inventors: Dana Levanony, Tel Aviv (IL); Moshe Raboh, Holon (IL)

(73) Assignee: International Business Machines Corporation, Armonk, NY (US)

(*) Notice: Subject to any disclaimer, the term of this patent is extended or adjusted under 35 U.S.C. 154(b) by 206 days.

(21) Appl. No.: 16/879,138

(22) Filed: May 20, 2020

(65) Prior Publication Data

US 2021/0366178 A1 Nov. 25, 2021

(51) Int. Cl.
*G06T 15/08* (2011.01)
*G06T 7/73* (2017.01)
*G06T 7/00* (2017.01)
*G06T 7/62* (2017.01)

(52) U.S. Cl.
CPC ............ *G06T 15/08* (2013.01); *G06T 7/0012* (2013.01); *G06T 7/62* (2017.01); *G06T 7/73* (2017.01); *G06T 2207/10072* (2013.01); *G06T 2207/20084* (2013.01)

(58) Field of Classification Search
CPC .. G06T 15/08; G06T 7/62; G06T 7/73; G06T 7/0012; G06T 2207/10072; G06T 2207/20084
See application file for complete search history.

(56) References Cited

U.S. PATENT DOCUMENTS

| | | | |
|---|---|---|---|
| 9,836,853 B1* | 12/2017 | Médioni | G06N 3/04 |
| 10,152,635 B2* | 12/2018 | Viswanathan | G06V 20/176 |
| 11,232,572 B2* | 1/2022 | Chen | G06N 3/08 |
| 2015/0117737 A1 | 4/2015 | Kim et al. | |
| 2018/0211111 A1* | 7/2018 | Viswanathan | G06V 30/194 |
| 2018/0240235 A1 | 8/2018 | Mazo | |
| 2021/0248747 A1* | 8/2021 | Tang | G06V 10/40 |

FOREIGN PATENT DOCUMENTS

CN 109446951 B 12/2019
WO 2017210690 A1 12/2017

\* cited by examiner

*Primary Examiner* — Shefali D Goradia
(74) *Attorney, Agent, or Firm* — Barry D. Blount

(57) ABSTRACT

An example system includes a processor to receive a three-dimensional (3D) volume. The processor can partition the 3D volume into slices. The processor can generate, via a two-dimensional (2D) neural network, slice features based on the slices. The processor can generate, via a three-dimensional (3D) neural network, a three-dimensional (3D) feature volume based on the slice features. The processor can generate, via a volume predictor, a volume prediction based on the 3D feature volume.

18 Claims, 11 Drawing Sheets

GENERATING VOLUME PREDICTIONS OF THREE-DIMENSIONAL VOLUMES USING SLICE FEATURES

BACKGROUND

The present techniques relate to classification of images. More specifically, the techniques relate to classification of three-dimensional medical images.

SUMMARY

According to an embodiment described herein, a system can include processor to receive a three-dimensional (3D) volume. The processor can also further partition the 3D volume into slices. The processor can also generate, via a two-dimensional (2D) neural network, slice features based on the slices. The processor can also further generate, via a 3D predictor, a volume prediction based on the slice features.

According to another embodiment described herein, a method can include receiving, via a processor, an annotated three-dimensional (3D) volume. The method can further include partitioning, via the processor, the 3D volume into slices. The method can also further include generating, via a two-dimensional (2D) neural network, slice features based on the slices. The method can also include fusing, via the processor, the slice features to generate a three-dimensional (3D) feature volume. The method can further include calculating, via the processor, a three-dimensional (3D) prediction loss based on a predicted volume generated, via a three-dimensional (3D) neural network, based on the 3D feature volume. The method can also further include modifying, via the processor, the 3D neural network based on the 3D prediction loss to produce a trained 3D neural network.

According to another embodiment described herein, a computer program product for training neural networks can include computer-readable storage medium having program code embodied therewith. The computer readable storage medium is not a transitory signal per se. The program code executable by a processor to cause the processor to receive an annotated three-dimensional (3D) volume. The program code can also cause the processor to partition the annotated 3D volume into slices. The program code can also cause the processor to generate slice features based on the slices. The program code can also cause the processor to. The program code can also cause the processor to merge the slice features to generate a three-dimensional (3D) feature volume. The program code can also cause the processor to also further calculate a three-dimensional (3D) prediction loss based on a predicted volume generated, via a three-dimensional (3D) neural network, based on the 3D feature volume. The program code can also cause the processor to modify the 3D neural network based on the 3D prediction loss to produce a trained 3D neural network.

DETAILED DESCRIPTION

Figure 1:
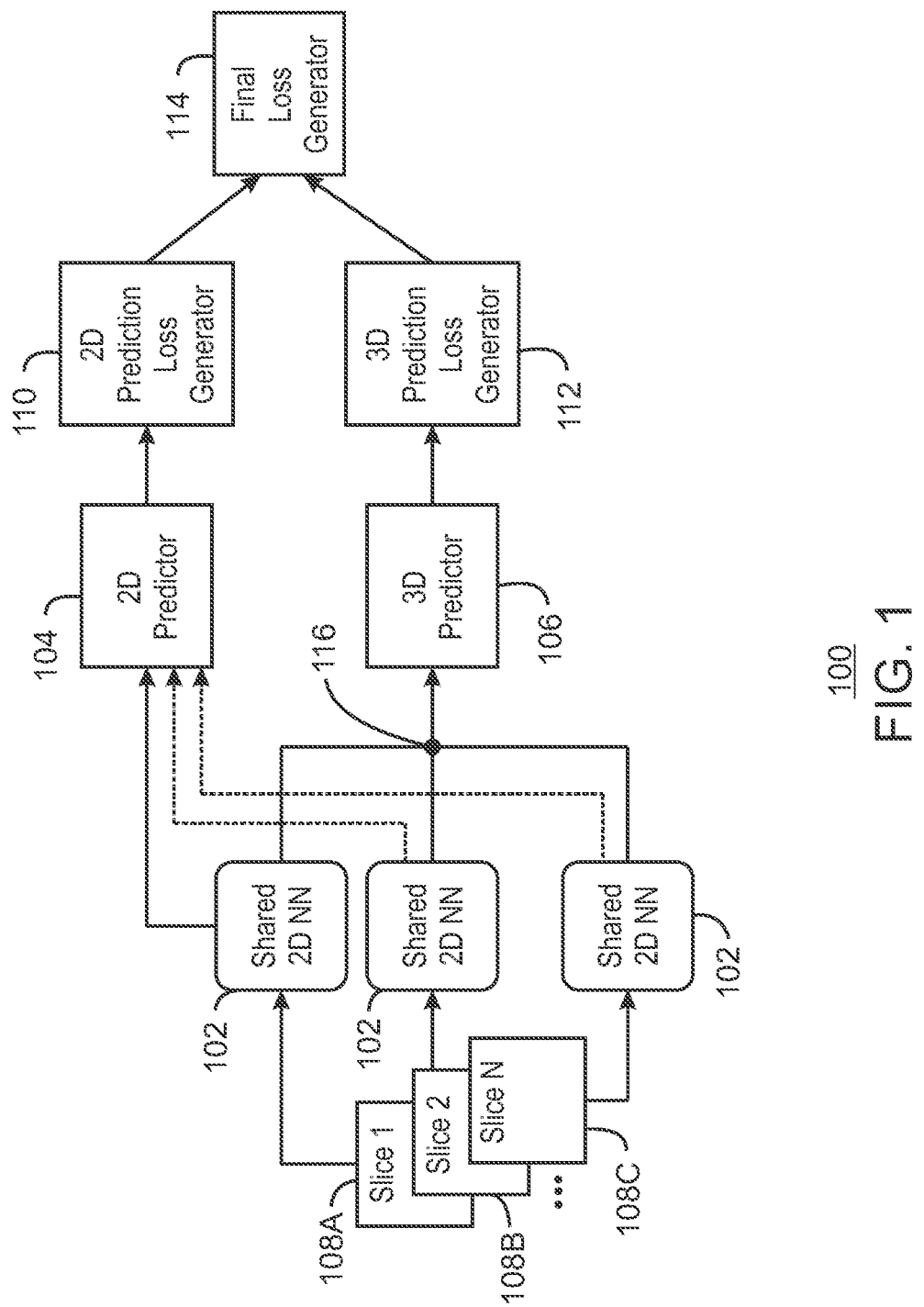
FIG. 1 is a block diagram of an example system for training a hybrid neural network medical image classifier.

Classification of three-dimensional (3D) medical images may be performed using neural networks. Medical imaging can be roughly separated to two types: two-dimensional (2D) imaging and three-dimensional (3D) imaging. For example, 2D imaging may include mammography, X-ray, etc. 3D imaging may include magnetic resonance imaging (MRI) and computerized tomography (CT). Volumes of medical images (3D images) may be produced by scanning a body part volume and producing slices of an organ image. Each of the slices is 2D image.

When performing classification tasks on these images using deep neural networks (DNN) the architectural approaches may be different. For example, convolution layers, which are a fundamental element of image related deep neural networks (DNNs), may be modified when operating on 3D image rather than on 2D image.

For example, three-dimensional images may be sliced into two-dimensional cross-section images. The two-dimensional images may then be annotated and used to train an image classifier to detect objects. During inference, the trained classifier may detect objects based on received slices of three-dimensional images. However, when aiming to detect abnormalities, or any other feature in these images, it is not clear that the feature will appear in each of the organ slices. For example, a hemangioma is a benign liver lump which has a distinct pattern of enhancement when injected with contrast material. These distinct features may not appear in all slices of a CT scan, but only in some of the slices. In addition, annotated medical images for training neural networks are expensive and involve time and money to acquire. Therefore, when trying to classify hemangiomas images, or any other 3D abnormality which does not show the same characteristics in all slices, such trained classifiers may encounter a number of issues. Since features may not appear in all slices, a volume cannot be partition into two-dimensional slices to effectively train a three-dimensional classifier. Moreover, small amounts of data available may lead to overfitting when training 3D neural network classifiers. Overfitting is the use of models or procedures that violate Occam's razor, for example by including more adjustable parameters than are ultimately optimal, or by using a more complicated approach than is ultimately optimal.

According to embodiments of the present disclosure, a system includes a processor that can receive a three-dimensional (3D) volume. The processor can partition the 3D volume into slices. The processor can generate, via a two-dimensional (2D) neural network, slice features based on the slices. The processor can generate, via a three-dimensional (3D) neural network, a three-dimensional (3D) feature volume based on the slice features. The processor can generate, via a volume predictor, a volume prediction based on the 3D feature volume. Thus, embodiments of the present disclosure allow efficient use of data during training. In particular, given a sample volume of N slices used for training, a 2D neural network may be trained on a total of N samples. Moreover, the total loss for the entire neural network may be combination of the 3D prediction loss and the 2D prediction loss. Therefore, the entire network may be trained on a total of N+1 samples for each sample volume. In addition, the present techniques may reduce the potential overfitting of models trained using small datasets in medical imaging by adding an auxiliary loss and thus regularizing the 2D components by also classifying each slice separately. Thus, the techniques described herein enable more efficient training which may result in better performance on a test set during inference.

With reference now to FIG. 1, a block diagram shows an example system for training a hybrid neural network three-dimensional medical image classifier. The example system 100 can be implemented via the computing device 800 of FIG. 8 using the method 600 of FIG. 6.

FIG. 1 includes a shared two-dimensional (2D) neural network (NN) 102. For example, although multiple instances of the 2D neural network 102 are shown, the 2D neural network 102 may actually be a single neural network. The system 100 includes a 2D predictor 104 communicatively coupled to the 2D neural network 102. The system 100 also includes a 3D predictor 106 communicatively coupled to the 2D neural network 102. The system 100 also includes a number of slices 108A, 108B, and 108C of a 3D volume. For example, the 3D volume may be a 3D medical image. The system 100 includes a 2D prediction loss calculator 110 communicatively coupled to the 2D predictor 104. The system 100 also includes a 3D prediction loss calculator 112 communicatively coupled to the 3D predictor 106. The system 100 also includes a final loss calculator 114 communicatively coupled to the 2D prediction loss calculator 110 and the 3D prediction loss calculator 112. A merger 116 is communicatively coupled to the shared 2D neural network 102 and the 3D predictor 106.

In the example of FIG. 1, an annotated 3D volume used for training may have been received and partitioned into slices 108A-108C. For example, the 3D volume may be partitioned into slices based on an algorithm for slice selection. In various examples, the slice selection may be along a general axis or according to a specified depth. The shared 2D neural network 102 can generate 2D slice features for each of the slices 108A-108C. For example, the slice features may be concatenated to produce three-dimensional feature maps. For example, the produced 3D feature maps may have a two-dimensional context. As shown in FIG. 1, the slice features from the shared 2D neural network 102 may be sent to both the 2D predictor 104 and the 3D predictor 106.

Still referring to FIG. 1, the 2D predictor 104 can generate a slice prediction based on the slice features corresponding to each of the slices 108A. In various examples, the 2D prediction loss generator 110 can generate a 2D prediction loss based on each of the slice predictions. For example, the 2D prediction loss generator 110 can compare the slice prediction with the corresponding slice annotation or image annotation to generate the 2D prediction loss. In various examples, as described below, the output of the 2D predictor 104 may only be used during a training stage.

The merger 116 can merge the slice features from the shared 2D neural network 102 to form a 3D feature volume. For example, the 3D feature volume. In some examples, the merger 116 can concatenate the slice features. The concatenated sliced features may then be sent to the 3D predictor 106.

The 3D predictor 106 can generate a 3D volume prediction based on the slice features received from the shared 2D neural network 102. For example, the 3D predictor 106 may include a 3D neural network to generate a 3D feature map based on the concatenated 2D slice features. For example, the 3D neural network of the predictor 106 can apply a 3D convolution to generate the 3D feature map and generate the 3D volume prediction via a volume predictor, as described in FIG. 3.

The 3D prediction loss generator 112 can generate a 3D prediction loss based on the 3D volume prediction from the 3D predictor 106. For example, the 3D prediction loss generator 112 can compare the 3D volume prediction to the annotation of the annotated 3D volume used to generate the slices 108A-108C during training.

The final loss generator 114 can generate a final loss based on the 2D prediction loss and the 3D prediction loss. For example, the final loss generator 114 can generate the final loss based on a weighted sum of the 2D prediction loss and the 3D prediction loss.

In various examples, the shared 2D neural network 102, the 2D predictor 104, and the 3D predictor 106 may be modified based on the final loss. For example, one or more weights of the 2D neural network 102, the 2D predictor 104, and the 3D predictor 106 may be adjusted based on the final loss using backpropagation.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional slices, neural networks, predictors, or additional losses, etc.).

Figure 2:
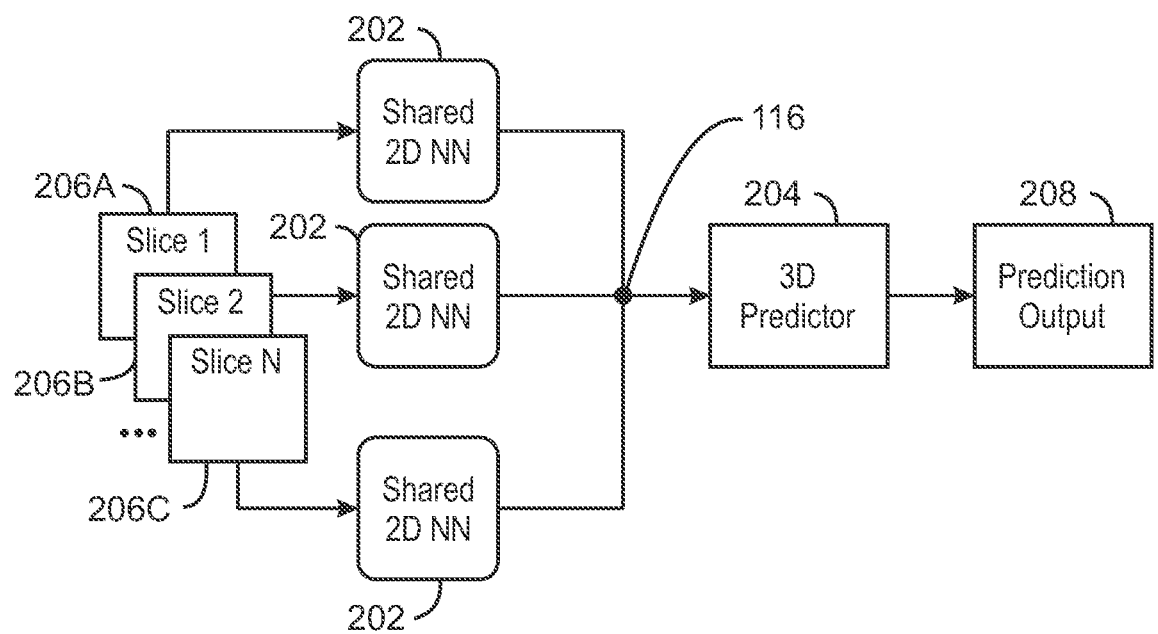
FIG. 2 is a block diagram of an example system for classifying three-dimensional images using a trained three-dimensional medical image classifier.

FIG. 2 is a block diagram that shows an example system for classifying three-dimensional images using a trained three-dimensional medical image classifier. The example system 200 can be implemented via the computing device 800 of FIG. 8 using the method 700 of FIG. 7.

The system 200 of FIG. 2 includes a shared 2D neural network (NN) 202. For example, the shared 2D neural network 202 may be the shared 2D neural network 102 after having been trained as described in FIG. 1. The system 200 also includes a 3D predictor 204 communicatively coupled to the shared 2D neural network 202. For example, the 3D predictor 204 may be the 3D predictor 106 after having been trained as described in FIG. 1. In some examples, the 3D predictor 204 may include a 3D neural network and a volume predictor, as described in FIG. 4.

In the example of FIG. 2, the system 200 may receive slices 206A-206C corresponding to a 3D volume. For example, the 3D volume may be a 3D medical image, such as a CT scan or an MRI scan. The 3D volume may have been partitioned into slices.

The shared 2D neural network 202 can receive the slices 206A-206C and generate slice features. In some examples, the slice features can be merged into 3D feature volumes. For example, the slice features can be concatenated to generate the 3D feature volumes.

Still referring to FIG. 2, the 3D predictor 204 can receive concatenated slice features form the shared 2D neural network 202 and generate a prediction output 208. For example, the prediction output 208 may be a volume prediction. In various examples, the 3D predictor 204 may include a 3D neural network and a volume predictor, as described in FIG. 4.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional slices, neural networks, predictors, or prediction outputs, etc.).

Figure 3:
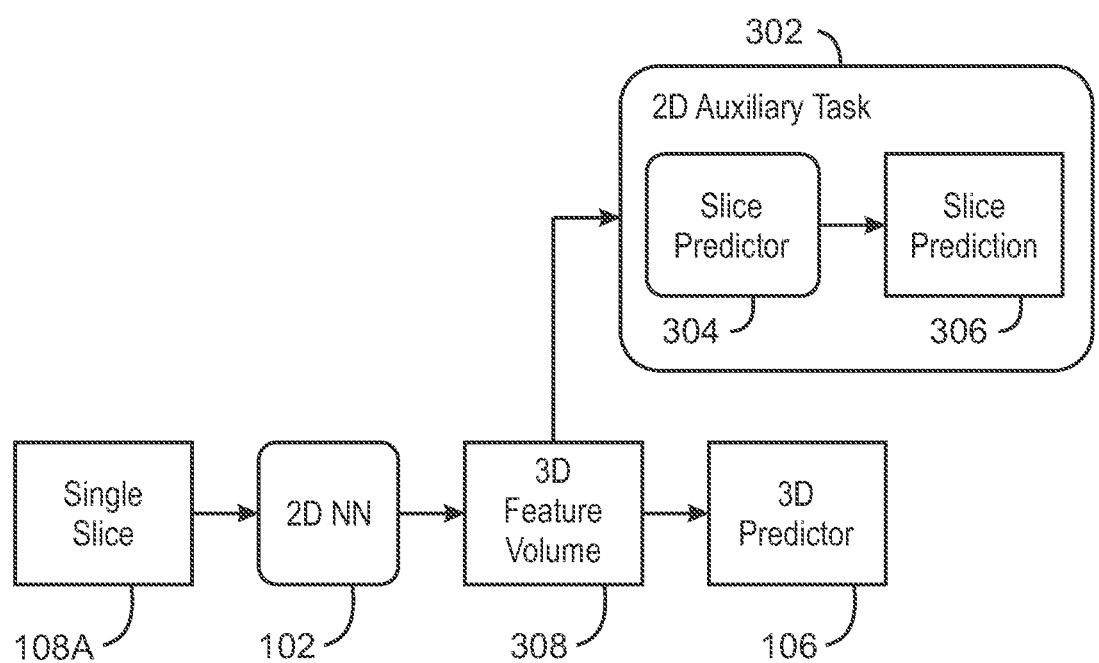
FIG. 3 is a block diagram of an example two-dimensional backbone network for training a three-dimensional medical image classifier.

FIG. 3 is a block diagram that shows an example two-dimensional (2D) backbone network for training a three-dimensional medical image classifier. The example 2D backbone network 300 can be implemented in the system 100, via the computing device 800 of FIG. 8, using the methods 500-700 of FIGS. 5-7.

FIG. 3 includes similarly numbered elements from FIG. 1. For example, the 2D backbone network 300 includes a single slice 108A, a 2D neural network 102, and a 3D predictor 106. In addition, the system 300 includes an auxiliary task component 302 including a slice predictor 304 shown generating a slice prediction 306. For example, the slice predictor 304 may be the 2D predictor 104 of FIG. 1. The auxiliary task component 302 is shown receiving a 3D feature volume 308 from the 2D neural network 102. For example, the 3D feature volume 308 may include a number of concatenated slice features. In some examples, the auxiliary task component 302 may receive a slice feature 308 corresponding to the single slice 108A directly without concatenation. Thus, the 3D feature volume 308 may be a 3D feature map with 2D context. The 3D feature volume 308 is also shown being sent to the 3D predictor 106.

In various examples, the 2D auxiliary task 302 can separately operate on individual slices 108A. In the example of FIG. 3, the 2D backbone network 300 receives a single slice 108A and produces two outputs. The slice prediction 306 may be an auxiliary output. For example, the slice prediction 306 can be a classification output. In some examples, the slice prediction 306 can be a segmentation output used to clean up the slice features of the 3D feature volume 308 and reduce overfitting. For example, the network may be exposed to more relevant data and therefore prevented from learning information that is not relevant. In various examples, this auxiliary output is not used in the 3D neural network. The 2D auxiliary task component 302 may be used to perform deep supervision during training of a network, such as the hybrid neural network of system 100.

Still referring to FIG. 3, in various examples, the 2D backbone network 300 may be trained in an end-to-end manner with the 3D predictor 106, and any other trainable components, using both an auxiliary loss and a 3D classification loss. For example, the 2D backbone network 300 may be trained using a final loss generated by method 600 of FIG. 6 as described in the system 100 of FIG. 1.

It is to be understood that the block diagram of FIG. 3 is not intended to indicate that the 2D backbone network 300 is to include all of the components shown in FIG. 3. Rather, the 2D backbone network 300 can include fewer or additional components not illustrated in FIG. 3 (e.g., additional slices, neural networks, predictors, or feature maps, etc.).

Figure 4:
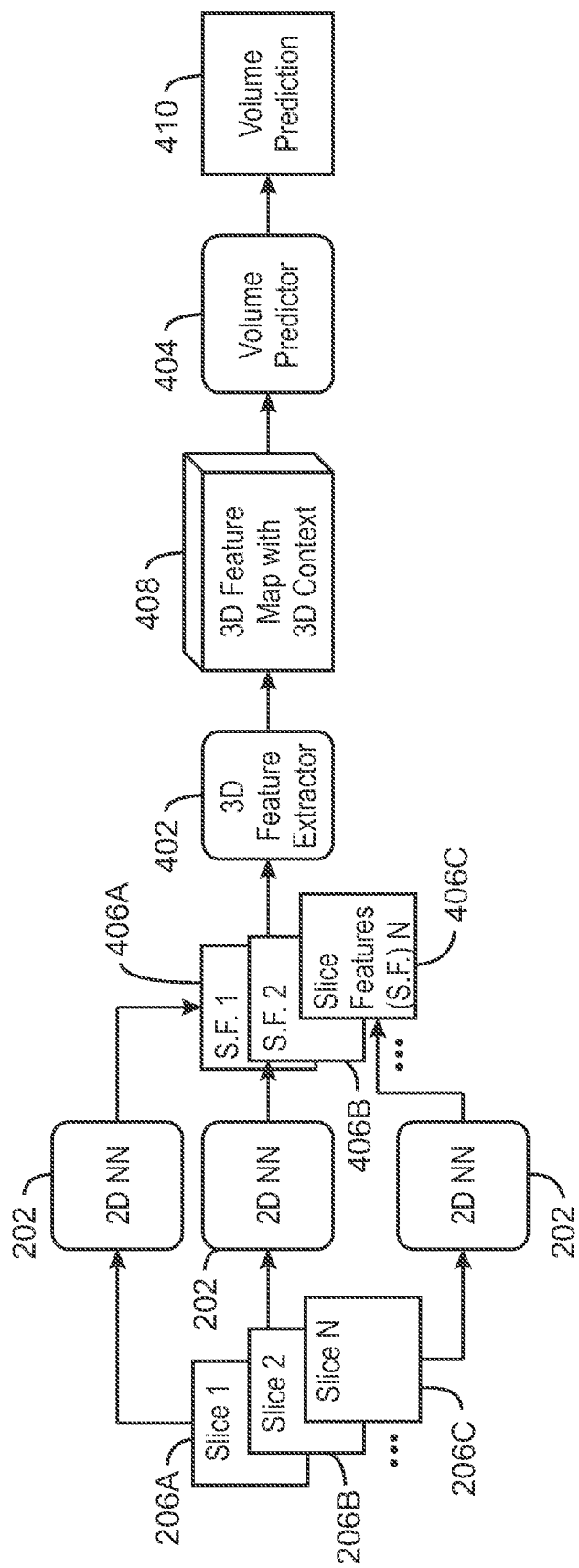
FIG. 4 is a block diagram of an example system for volume prediction using a trained three-dimensional medical image classifier.

FIG. 4 is a block diagram that shows an example system for volume prediction using a trained three-dimensional medical image classifier. The example system is generally referred to by the reference number 400.

FIG. 4 includes similarly numbered elements from FIG. 2. In addition, the system 400 includes a 3D feature extractor 402 communicatively coupled to the 2D neural network 202 and a volume predictor 404. For example, the 3D feature extractor 402 may be a 3D neural network trained to extracted 3D features.

In the example of FIG. 4, the 2D neural network 202 generates a set of slice features 406A, 406B, and 406C corresponding to slices 206A, 206B, and 206C, respectively. For example, the slice features 406A-406C may be combined into 3D feature maps with 2D context. In various examples, the 2D neural network 202 may have been trained to generate the slice features as described in the system 100 or the method 600 of FIG. 6. In some examples, the slice features 406A-406C can be merged via merger 116 to generate a 3D feature volume for each received set of slices corresponding to a 3D volume. For example, the slice features 406A-406C can be concatenated to form the 3D feature volume.

Still referring to FIG. 4, the 3D feature extractor 402 may generate a 3D feature map with 3D context 408. For example, the 3D feature extractor 402 can receive a 3D feature volume including a merged set of slice features and apply a 3D convolution to the 3D feature volume to generate the 3D feature map 408. The 3D feature map may be a feature map with 3D context. In various examples, the context may include the order of the set of slice features maps. For example, the slice features 406B may be related to the previous slice features 406A and the subsequent slice features 406C, which may have relevant features to the slice features 406B. The 3D feature map may be sent to the volume predictor 404.

The volume predictor 404 can generate a volume prediction based on the 3D feature map. For example, the volume predictor 404 may be a 3D classifier that classifies the 3D volume corresponding to the slices 206A-206C based on the 3D feature map from the 3D neural network 402. As one example, the volume prediction 410 may be a particular type of benign tumor, such as a hemangioma. In some examples, the volume prediction 410 may be a cancerous form of tumor, or any other object to be detected in the 3D volume.

It is to be understood that the block diagram of FIG. 4 is not intended to indicate that the system 400 is to include all of the components shown in FIG. 4. Rather, the system 400 can include fewer or additional components not illustrated in FIG. 4 (e.g., additional slices, neural networks, predictors, or feature maps, etc.).

Figure 5:
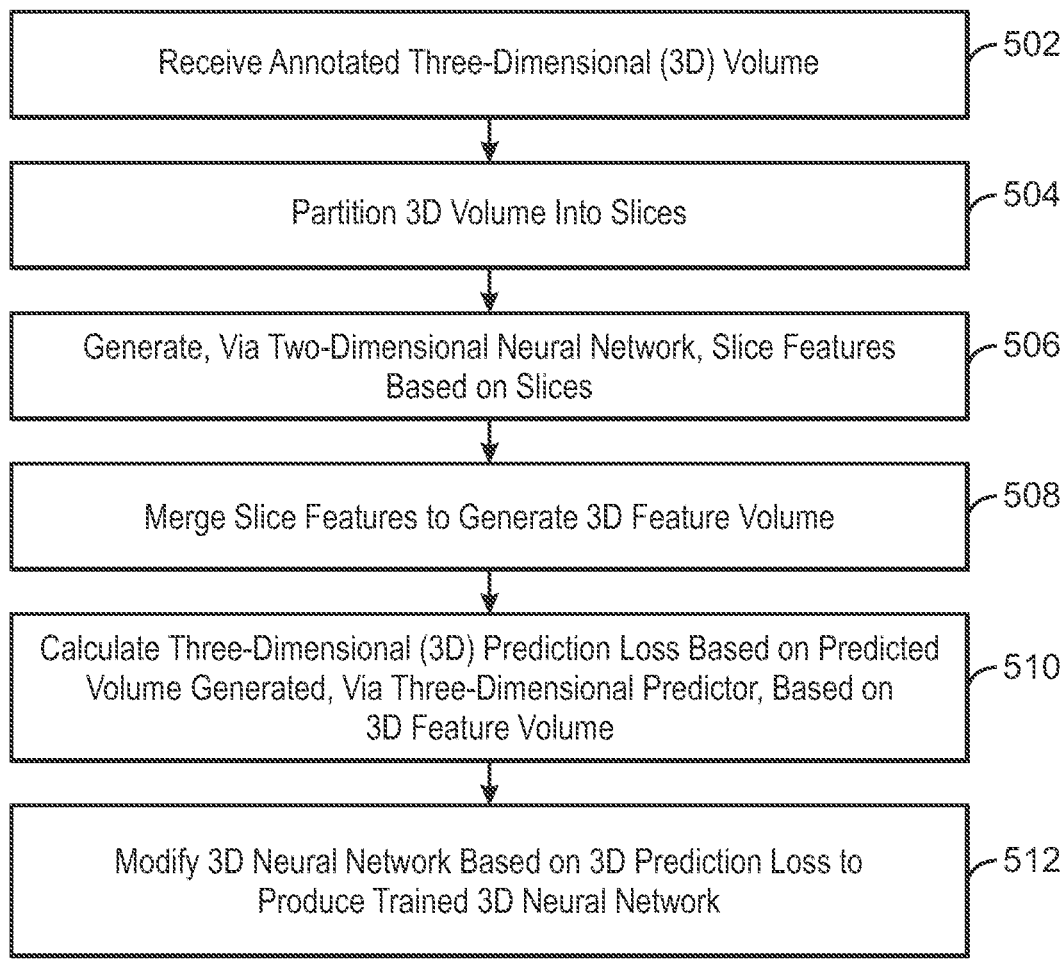
FIG. 5 is a block diagram of an example method that can train a three-dimensional network to classify three-dimensional medical images.

FIG. 5 is a process flow diagram of an example method that can train a three-dimensional network to classify three-dimensional medical images. The method 500 can be implemented with any suitable computing device, such as the computing device 800 of FIG. 8 and is described with reference to the systems 100 of FIG. 1. For example, the methods described below can be implemented by the processor 802 of the computing device 800 of FIG. 8.

At block 502, an annotated three-dimensional (3D) volume is received. For example, the annotated 3D volume may be a training sample of an object to be detected in 3D medical images.

At block 504, the 3D volume is partitioned into slices. For example, the 3D volume may be partitioned into slices along a general axis or according to a specified depth.

At block 506, slice features are generated based on the slices via a two-dimensional (2D) neural network. In some examples, the slice features may be merged to form 3D feature maps.

At block 508, the slice features are merged to generate a three-dimensional (3D) feature volume. For example, the 3D feature volume may be a 3D feature map with 2D context. In some examples, the slice features may be concatenated.

At block 510, a three-dimensional (3D) prediction loss is calculated based on a predicted volume generated based on the 3D feature volume via a three-dimensional (3D) neural network.

At block 512, the 3D neural network is modified based on the 3D prediction loss to produce a trained 3D neural network. For example, one or more weights of the 3D neural network may be adjusted based on the 3D prediction loss.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
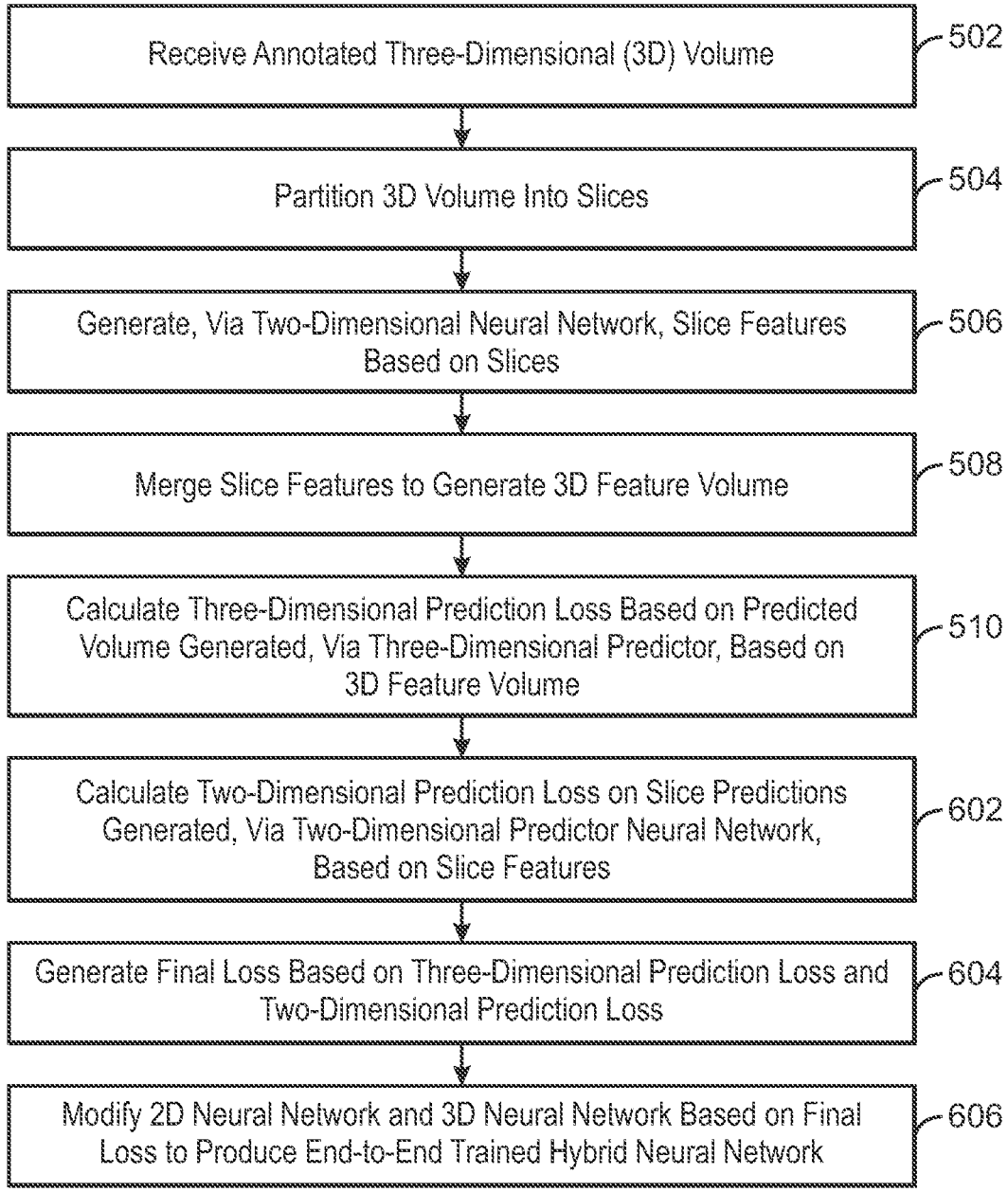
FIG. 6 is a block diagram of an example method that can train a hybrid neural network to classify three-dimensional medical images.

FIG. 6 is a process flow diagram of an example method that can train a hybrid neural network to classify three-dimensional medical images. The method 600 can be implemented with any suitable computing device, such as the computing device 300 of FIG. 3 and is described with reference to the systems 100 and 300 of FIGS. 1 and 3. For example, the method 600 can be implemented by the processor 802 of the computing device 800 of FIG. 8.

The method 600 of FIG. 5 includes similarly numbered blocks of FIG. 5. In addition, at block 602, a two-dimensional (2D) prediction loss is calculated based on a slice prediction generated based on the slice features via a two-dimensional (2D) neural network. For example, the slice prediction may be an auxiliary output of the 2D neural network that is not used to generate a volume prediction at inference.

At block 604, a final loss is generated based on the 3D prediction loss and the 2D prediction loss. For example, the final loss may be generated by calculating a weighted sum of the 2D prediction loss and the 3D prediction loss.

At block 606, the 2D neural network and the 3D neural network are modified based on the final loss to produce an end-to-end trained hybrid neural network. For example, one or more weights of the 2D neural network and the 3D neural network may be modified based on the final loss.

The process flow diagram of FIG. 6 is not intended to indicate that the operations of the method 600 are to be executed in any particular order, or that all of the operations of the method 600 are to be included in every case. Additionally, the method 600 can include any suitable number of additional operations. For example, the method 600 may also include receiving an unannotated 3D volume, and modifying the 2D neural network and the 3D neural network using semi-supervised training. For example, the method 600 may include using any suitable semi-supervised training technique.

Figure 7:
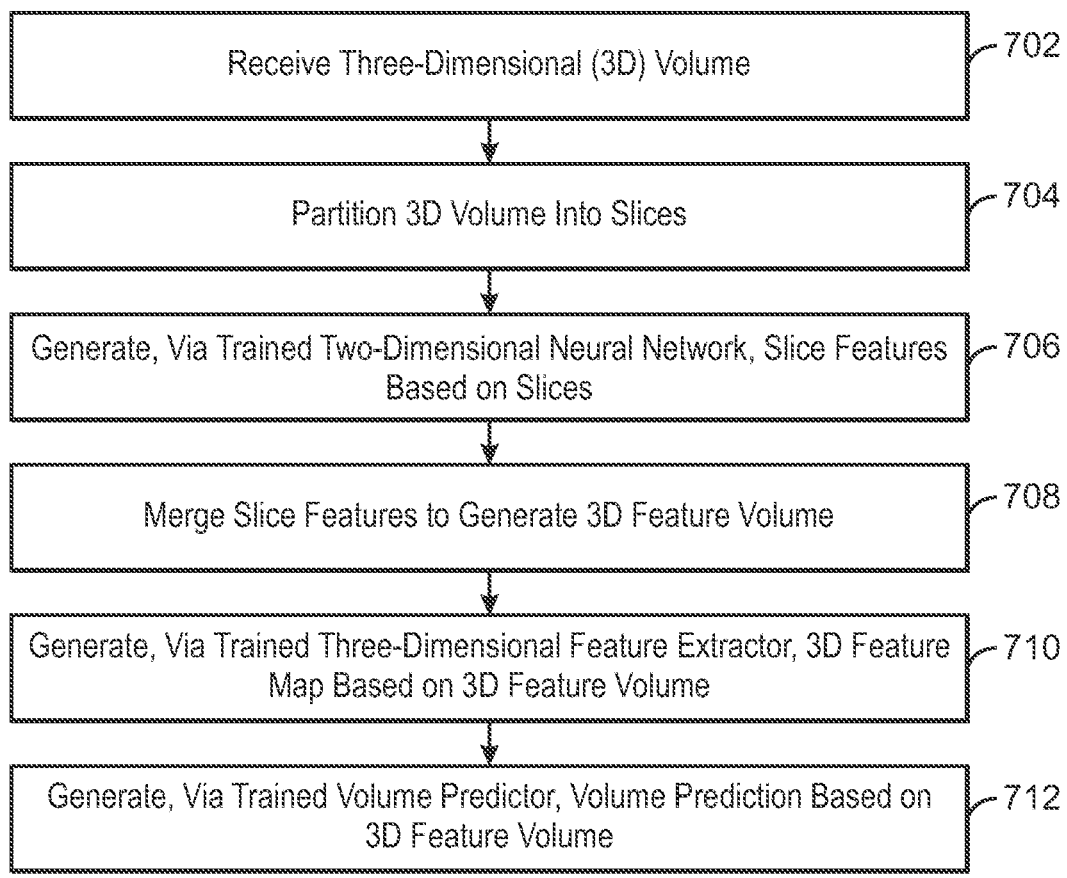
FIG. 7 is a block diagram of an example method that can generate volume predictions based on three-dimensional volumes.

FIG. 7 is a process flow diagram of an example method that can generate volume predictions based on three-dimensional volumes. The method 700 can be implemented with any suitable computing device, such as the computing device 300 of FIG. 3 and is described with reference to the systems 200 and 400 of FIGS. 2 and 4. For example, the method 700 can be implemented by the processor 802 of the computing device 800 of FIG. 8.

At block 702, a three-dimensional (3D) volume is received. For example, the 3D volume may be a 3D medical image, such as a CT scan or an MRI scan.

At block 704, the 3D volume is partitioned into slices. For example, the 3D volume may be partitioned into slices along a general axis or according to a specified depth.

At block 706, slice features are generated based on the slices via a trained two-dimensional (2D) neural network. For example, the slice features may be generated in the form of a 2D feature map.

At block 708, the slice features are merged to generate a 3D feature volume. In some examples, the slice features may be concatenated.

At block 710, a three-dimensional (3D) feature map is generated based on the 3D feature volume via a trained three-dimensional (3D) feature extractor. For example, the trained 3D feature extractor may be a 3D neural network trained to perform a 3D convolution on the 3D feature volume to generate the 3D feature map.

At block 712, a volume prediction is generated based on the 3D feature volume via a volume predictor. For example, the volume prediction may be an object such as a benign or a malignant tumor.

The process flow diagram of FIG. 7 is not intended to indicate that the operations of the method 700 are to be executed in any particular order, or that all of the operations of the method 700 are to be included in every case. Additionally, the method 700 can include any suitable number of additional operations.

In some scenarios, the techniques described herein may be implemented in a cloud computing environment. As discussed in more detail below in reference to at least FIGS. 8-11, a computing device configured to classify three-dimensional medical images using two-dimensional context may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
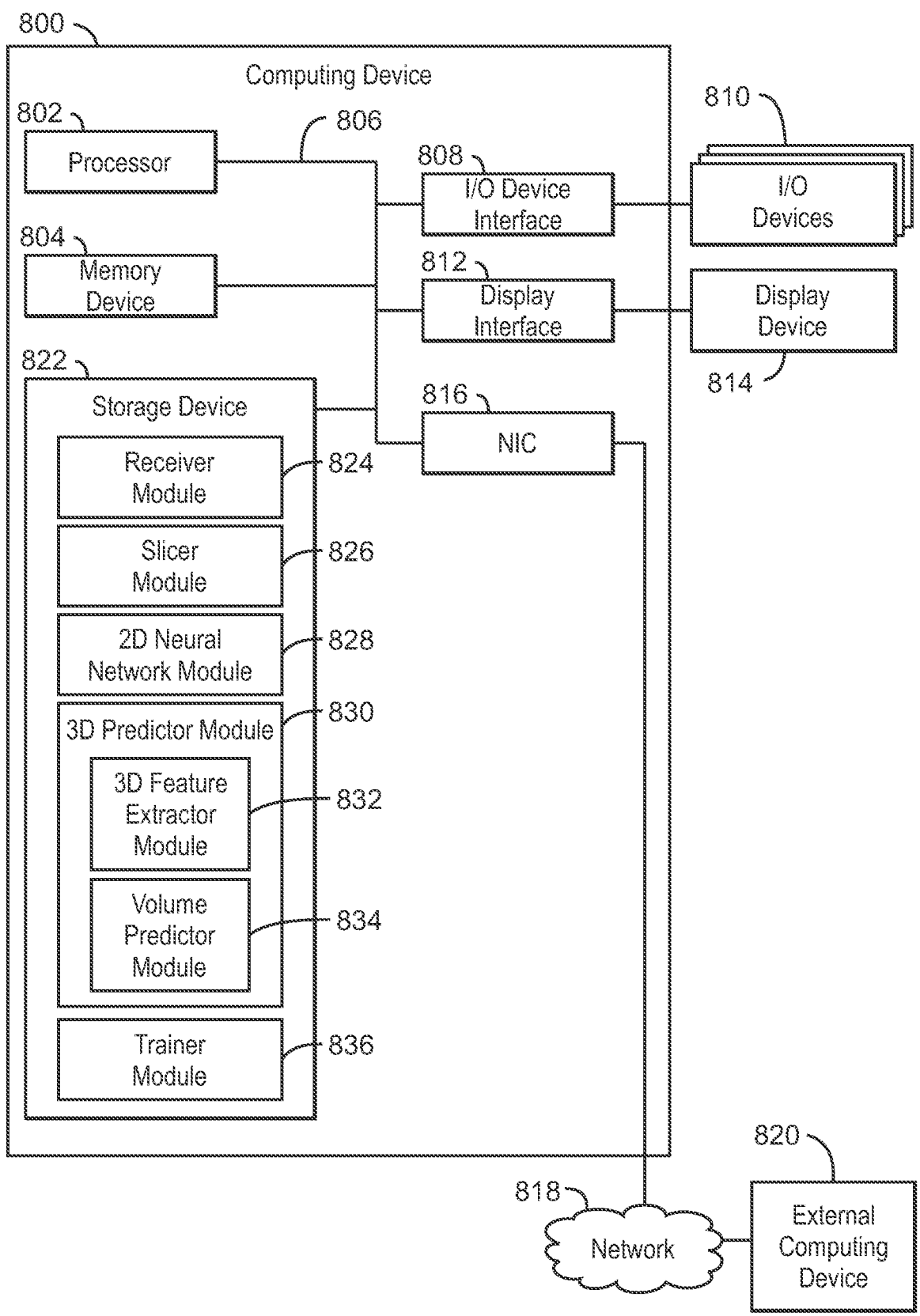
FIG. 8 is a block diagram of an example computing device that can classify three-dimensional medical images using two-dimensional context.

FIG. 8 is block diagram of an example computing device that can classify three-dimensional medical images using two-dimensional context. The computing device 800 may be for example, a server, desktop computer, laptop computer, tablet computer, or smartphone. In some examples, computing device 800 may be a cloud computing node. Computing device 800 may be described in the general context of computer system executable instructions, such as program modules, being executed by a computer system. Generally, program modules may include routines, programs, objects, components, logic, data structures, and so on that perform particular tasks or implement particular abstract data types. Computing device 800 may be practiced in distributed cloud computing environments where tasks are performed by remote processing devices that are linked through a communications network. In a distributed cloud computing environment, program modules may be located in both local and remote computer system storage media including memory storage devices.

The computing device 800 may include a processor 802 that is to execute stored instructions, a memory device 804 to provide temporary memory space for operations of said instructions during operation. The processor can be a single-core processor, multi-core processor, computing cluster, or any number of other configurations. The memory 804 can include random access memory (RAM), read only memory, flash memory, or any other suitable memory systems.

The processor 802 may be connected through a system interconnect 806 (e.g., PCI®, PCI-Express®, etc.) to an input/output (I/O) device interface 808 adapted to connect the computing device 800 to one or more I/O devices 810. The I/O devices 810 may include, for example, a keyboard and a pointing device, wherein the pointing device may include a touchpad or a touchscreen, among others. The I/O devices 810 may be built-in components of the computing device 800, or may be devices that are externally connected to the computing device 800.

The processor 802 may also be linked through the system interconnect 806 to a display interface 812 adapted to connect the computing device 800 to a display device 814. The display device 814 may include a display screen that is a built-in component of the computing device 800. The display device 814 may also include a computer monitor, television, or projector, among others, that is externally connected to the computing device 800. In addition, a network interface controller (NIC) 816 may be adapted to connect the computing device 800 through the system interconnect 806 to the network 818. In some embodiments, the NIC 816 can transmit data using any suitable interface or protocol, such as the internet small computer system interface, among others. The network 818 may be a cellular network, a radio network, a wide area network (WAN), a local area network (LAN), or the Internet, among others. An external computing device 820 may connect to the computing device 800 through the network 818. In some examples, external computing device 820 may be an external web-server 820. In some examples, external computing device 820 may be a cloud computing node.

The processor 802 may also be linked through the system interconnect 806 to a storage device 822 that can include a hard drive, an optical drive, a USB flash drive, an array of drives, or any combinations thereof. In some examples, the storage device may include a receiver module 824, a slicer module 826, a two-dimensional (2D) neural network module 828, a 3D predictor 830, including a three-dimensional (3D) feature extractor module 832 and a volume predictor module 834, and a trainer module 836. The receiver module 824 can receive a three-dimensional (3D) volume. The slicer module 826 can partition the 3D volume into slices. The 2D neural network module 828 can generate slice features based on the slices. In some examples, the 2D neural network module 828 includes a slice predictor that generates a slice prediction used to calculate a 2D prediction loss at a training of the system. The 3D predictor module 830 can generate a volume prediction based on the slice features. For example, the 3D feature extractor module 832 can generate a 3D feature map based on the slice features. In some examples, the 3D feature extractor module 832 may generate the 3D feature map based on a 3D feature volume of merged slice features. For example, the slice features may be concatenated to generate the 3D feature volume. In various examples, the 3D feature extractor module 832 can generate the 3D feature map by applying a 3D convolution to the slice features or the 3D feature volume. The volume predictor module 834 can generate a volume prediction based on the 3D feature map. The trainer module 836 can train the 2D neural network and the 3D predictor. For example, the trainer module 836 can jointly train the 2D neural network and the 3D n predictor using a 2D prediction loss computed based on a slice prediction and a 3D prediction loss computed based on a volume prediction. In some examples, the trainer module 836 can train the 2D neural network and the 3D predictor based on a total loss including a weighted sum of a 2D prediction loss and a 3D prediction loss. In various examples, the trainer module 836 can train the 2D neural network and the 3D predictor in an end-to-end training using an annotated 3D volume. For example, the annotated 3D volume may be a 3D medical image with a labeled object to be detected in other 3D medical images at inference.

It is to be understood that the block diagram of FIG. 8 is not intended to indicate that the computing device 800 is to include all of the components shown in FIG. 8. Rather, the computing device 800 can include fewer or additional components not illustrated in FIG. 8 (e.g., additional memory components, embedded controllers, modules, additional network interfaces, etc.). For example, the computing device 800 can also include a merger to merge the slice features to generate a 3D feature volume. For example, the merger can concatenate or merge the slice features to generate the 3D feature volume. In some examples, the receiver module 824 can receive an unannotated 3D volume and the trainer module 836 can modify the 2D neural network and the 3D neural network using semi-supervised training. For example, the trainer module 836 can use any suitable semi-supervised training technique. Furthermore, any of the functionalities of the receiver module 824, the slicer module 826, the 2D neural network module 828, the 3D predictor module 830, including the 3D feature extractor module 832 and the volume predictor module 834, or the trainer module 836 may be partially, or entirely, implemented in hardware and/or in the processor 802. For example, the functionality may be implemented with an application specific integrated circuit, logic implemented in an embedded controller, or in logic implemented in the processor 802, among others. In some embodiments, the functionalities of the receiver module 824, the slicer module 826, the 2D neural network module 828, the 3D predictor module 830, the 3D feature extractor module 832, the volume predictor module 834, and the trainer module 836 can be implemented with logic, wherein the logic, as referred to herein, can include any suitable hardware (e.g., a processor, among others), software (e.g., an application, among others), firmware, or any suitable combination of hardware, software, and firmware.

Figure 9:
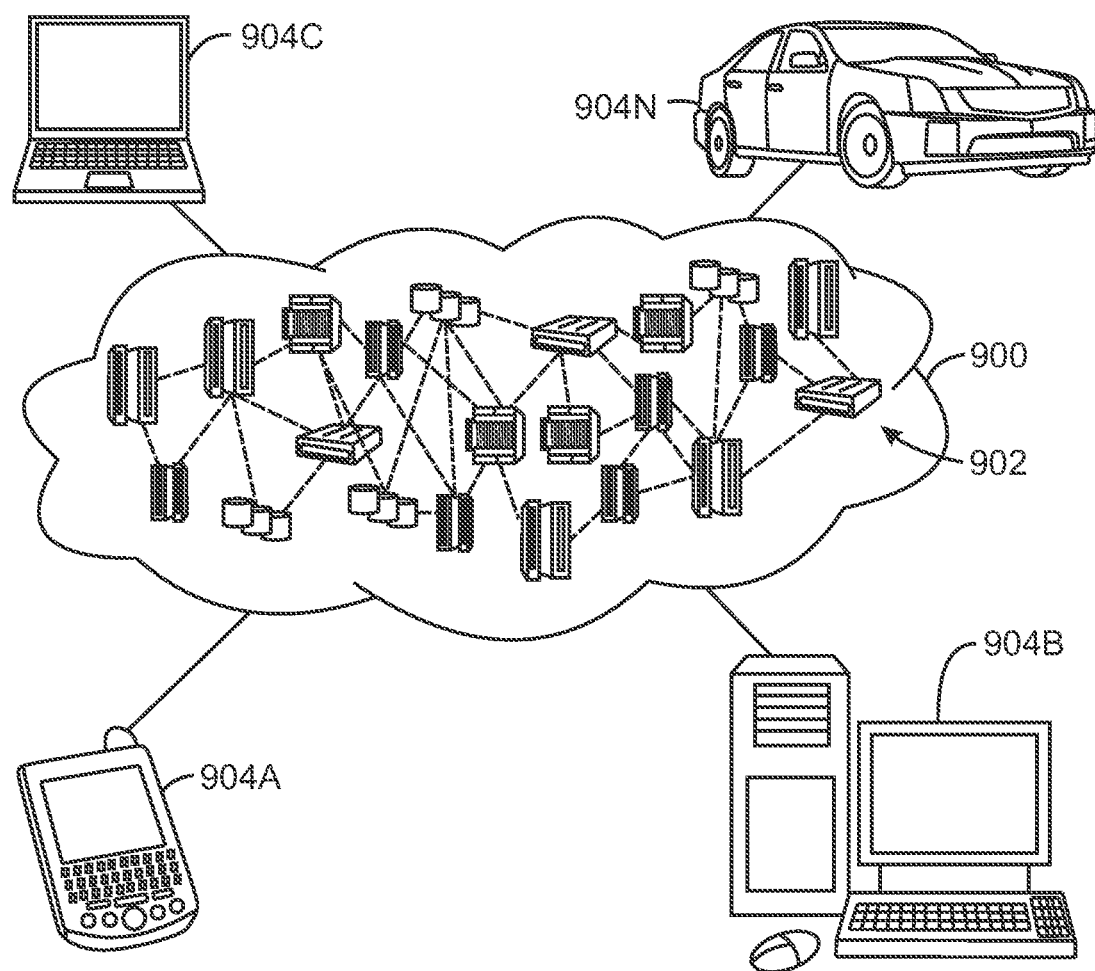
FIG. 9 is a diagram of an example cloud computing environment according to embodiments described herein.

Referring now to FIG. 9, illustrative cloud computing environment 900 is depicted. As shown, cloud computing environment 900 comprises one or more cloud computing nodes 902 with which local computing devices used by cloud consumers, such as, for example, personal digital assistant (PDA) or cellular telephone 904A, desktop computer 904B, laptop computer 904C, and/or automobile computer system 904N may communicate. Nodes 902 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 904A-N shown in FIG. 9 are intended to be illustrative only and that computing nodes 902 and cloud computing environment 900 can communicate with any type of computerized device over any type of network and/or network addressable connection (e.g., using a web browser).

Figure 10:
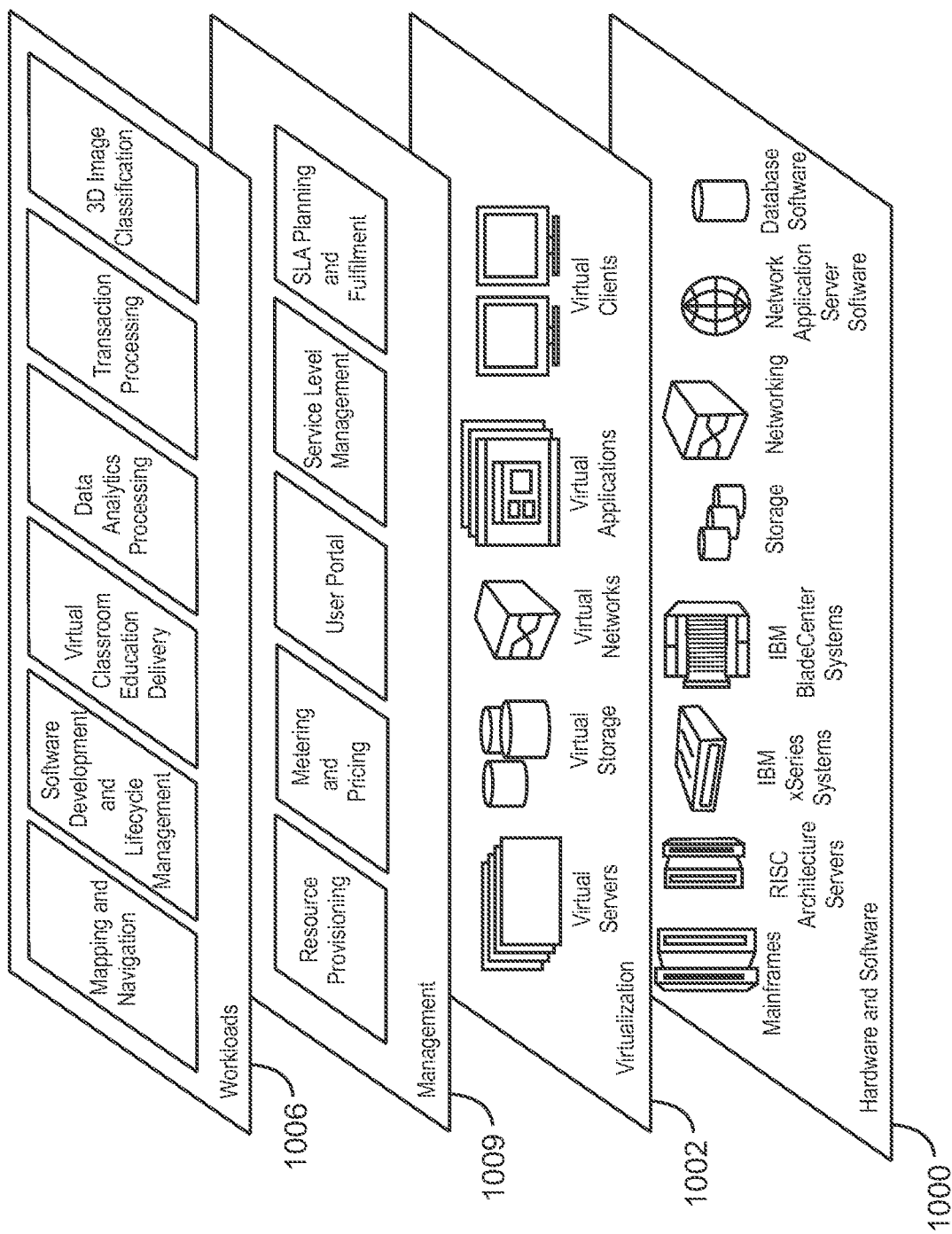
FIG. 10 is a diagram of an example abstraction model layers according to embodiments described herein.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided.

Hardware and software layer 1000 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1002 provides an abstraction layer from which the following examples of virtual entities may be provided: virtual servers; virtual storage; virtual networks, including virtual private networks; virtual applications and operating systems; and virtual clients. In one example, management layer 1004 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 1006 provides examples of functionality for which the cloud computing environment may be utilized. Examples of workloads and functions which may be provided from this layer include: mapping and navigation; software development and lifecycle management; virtual classroom education delivery; data analytics processing; transaction processing; and volume prediction in medical imaging.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 11:
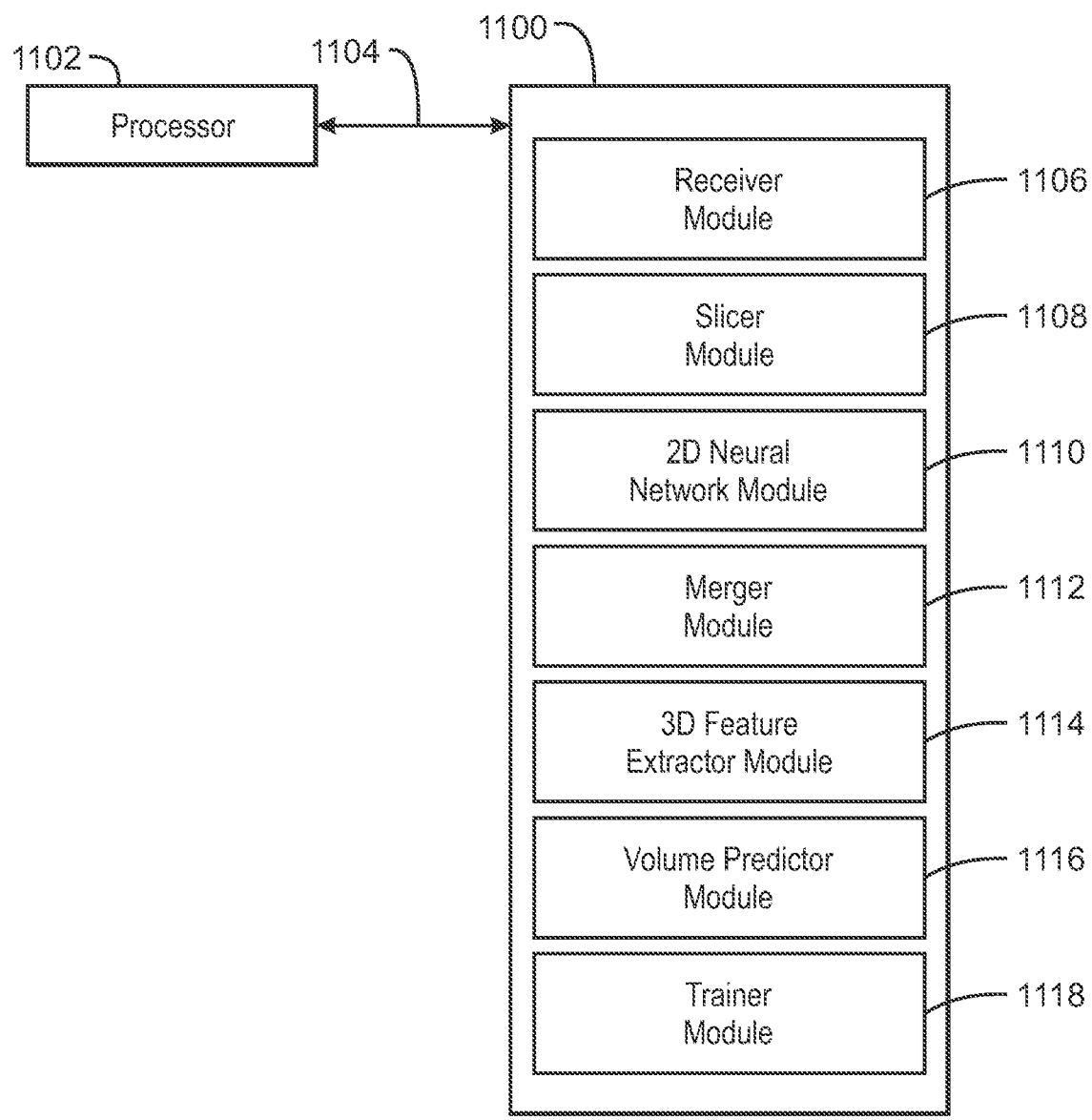
FIG. 11 is an example tangible, non-transitory computer-readable medium that can classify three-dimensional medical images using two-dimensional context.

Referring now to FIG. 11, a block diagram is depicted of an example tangible, non-transitory computer-readable medium 1100 that can classify three-dimensional medical images using two-dimensional context. The tangible, non-transitory, computer-readable medium 1100 may be accessed by a processor 1102 over a computer interconnect 1104. Furthermore, the tangible, non-transitory, computer-readable medium 1100 may include code to direct the processor 1102 to perform the operations of the methods 500-700 of FIGS. 5-7.

The various software components discussed herein may be stored on the tangible, non-transitory, computer-readable medium 1100, as indicated in FIG. 11. For example, a receiver module 1106 includes code to receive an annotated three-dimensional (3D) volume. For example, the receiver module 1106 includes code to receive the annotated three-dimensional (3D) volume at training. As one example, the annotated 3D volume may be a 3D medical image containing an annotated object. In some examples, the receiver module 1106 includes code to receive an unannotated 3D volume at inference. A slicer module 1108 includes code to partition the annotated 3D volume into slices. A 2D neural network module 1110 includes code to generate slice features based on the slices. The 2D neural network module 1110 also includes code to generate slice predictions based on the slices. A merger module 1112 includes code to generate a three-dimensional (3D) feature volume based on the slice features. For example, the merger module 1112 includes code to concatenate the slice features to generate 3D feature volumes. In some examples, the merger module 1112 includes code to merge the slice features to generate 3D feature volumes. A 3D feature extractor module 1114 includes code to generate a 3D feature map based on the 3D feature volume. For example, the 3D feature extractor module 1114 includes code to perform a 3D convolution on the 3D feature volume to generate the 3D feature map. A volume predictor 1116 includes code to generate a volume prediction based on the 3D feature map. The trainer module 1118 includes code to calculate a three-dimensional (3D) prediction loss based on a predicted volume generated, via a three-dimensional (3D) neural network, based on the 3D feature volume. In some examples, the trainer module 1118 includes code to modify the 3D neural network based on the 3D prediction loss to produce a trained 3D neural network. In various examples, the trainer module 1118 includes code to calculate a two-dimensional (2D) prediction loss based on a slice prediction generated, via the two-dimensional (2D) neural network, based on the slice features. The trainer module 1118 includes code to generate a final loss based on the 3D prediction loss and the 2D prediction loss. For example, the trainer module 1118 may include code to calculate a final loss based on a weighted sum of the 2D prediction loss and the 3D prediction loss. The trainer module 1118 includes code to modify the 2D neural network and the 3D neural network based on the final loss to produce an end-to-end trained hybrid neural network. It is to be understood that any number of additional software components not shown in FIG. 11 may be included within the tangible, non-transitory, computer-readable medium 1100, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 11 may be included within the tangible, non-transitory, computer-readable medium 1100, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive a three-dimensional (3D) volume;
partition the 3D volume into slices;
generate, via a shared two-dimensional (2D) neural network, slice features based on the slices, wherein the shared 2D neural network is trained via deep supervision using a 2D auxiliary task component comprising a slice predictor that predicts slice predictions based on slice features generated by the shared 2D neural network to generate an auxiliary loss used for the deep supervision; and
generate, via a 3D predictor, a volume prediction based on a 3D feature volume comprising merged slice features, wherein the 3D predictor is coupled to a merger that merges the slice features from the shared 2D neural network, wherein the volume prediction is used to calculate a 3D prediction loss for training the shared 2D neural network.

2. The system of claim 1, wherein the shared 2D neural network and the 3D predictor are jointly trained using a 2D prediction loss comprising the auxiliary loss computed based on the slice predictions and the 3D prediction loss computed based on the volume prediction.

3. The system of claim 1, wherein the shared 2D neural network and the 3D predictor are jointly trained based on a total loss comprising a weighted sum of a 2D prediction loss and a 3D prediction loss.

4. The system of claim 1, wherein the 3D predictor comprises a three-dimensional (3D) feature extractor to generate a three-dimensional (3D) feature map based on the slice features, and a volume predictor to generate a volume prediction based on the 3D feature map.

5. The system of claim 1, wherein the processor is to receive an unannotated 3D volume and modify the shared 2D neural network and the 3D neural network using semi-supervised training.

6. A computer-implemented method, comprising:
receiving, via a processor, an annotated three-dimensional (3D) volume;
partitioning, via the processor, the annotated 3D volume into slices;
generating, via a two-dimensional (2D) neural network, slice features based on the slices, wherein the shared 2D neural network is trained via deep supervision using a 2D auxiliary task component comprising a slice predictor that predicts slice predictions based on slice features generated by the shared 2D neural network to generate an auxiliary loss used for the deep supervision;
fusing, via the processor, the slice features to generate a three-dimensional (3D) feature volume;

calculating, via the processor, a three-dimensional (3D) prediction loss based on a predicted volume generated, via a three-dimensional (3D) neural network, based on the 3D feature volume; and modifying, via the processor, the shared 2D neural network and the 3D neural network based on the 3D prediction loss to produce a trained shared 2D neural network and a trained 3D neural network.

7. The computer-implemented method of claim 6, comprising:

receiving, via the processor, a second three-dimensional (3D) volume;

partitioning, via the processor, the second 3D volume into slices;

generating, via the two-dimensional (2D) neural network, slice features based on the slices;

fusing, via the processor, the slice features to generate a 3D feature volume;

generating, via a trained three-dimensional (3D) feature extractor, a three-dimensional (3D) feature volume based on the 3D feature volume; and generating, via a volume predictor, a volume prediction based on the 3D feature volume.

8. The computer-implemented method of claim 6, comprising:

calculating, via the processor, a two-dimensional (2D) prediction loss based on a slice prediction generated, via the two-dimensional (2D) neural network, based on the slice features;

generating, via the processor, a final loss based on the 3D prediction loss and the 2D prediction loss; and modifying, via the processor, the shared 2D neural network and the 3D neural network based on the final loss to produce an end-to-end trained hybrid neural network.

9. The computer-implemented method of claim 8, comprising receiving, via the processor, a three-dimensional (3D) volume and generating, via a volume predictor of the end-to-end trained hybrid neural network, a volume prediction.

10. The computer-implemented method of claim 8, wherein generating the final loss comprises calculating a weighted sum of the 2D prediction loss and the 3D prediction loss.

11. The computer-implemented method of claim 8, comprising receiving an unannotated 3D volume, and modifying the shared 2D neural network and the 3D neural network using semi-supervised training.

12. A computer program product for training neural networks, the computer program product comprising a computer-readable storage medium having program code embodied therewith, wherein the computer-readable storage medium is not a transitory signal per se, the program code executable by a processor to cause the processor to:

receive an annotated three-dimensional (3D) volume;

partition the annotated 3D volume into slices;

generate slice features based on the slices via a shared 2D neural network trained via deep supervision using a 2D auxiliary task component comprising a slice predictor that predicts slice predictions based on slice features generated by the shared 2D neural network to generate an auxiliary loss used for the deep supervision;

merge the slice features to generate a three-dimensional (3D) feature volume;

calculate a three-dimensional (3D) prediction loss based on a predicted volume generated, via a three-dimensional (3D) neural network, based on the 3D feature volume; and modify the shared 2D neural network and the 3D neural network based on the 3D prediction loss to produce a trained shared 2D neural network and a trained 3D neural network.

13. The computer program product of claim 12, further comprising program code executable by the processor to:

receive a second three-dimensional (3D) volume;

partition the second 3D volume into slices;

generate slice features based on the slices;

generate a three-dimensional (3D) feature volume based on the slice features;

generate a 3D feature map based on the 3D feature volume; and generate a volume prediction based on the 3D feature map.

14. The computer program product of claim 12, further comprising program code executable by the processor to:

calculate a two-dimensional (2D) prediction loss based on a slice prediction generated, via the two-dimensional (2D) neural network, based on the slice features;

generate a final loss based on the 3D prediction loss and the 2D prediction loss; and modify the shared 2D neural network and the 3D neural network based on the final loss to produce an end-to-end trained hybrid neural network.

15. The computer program product of claim 14, further comprising program code executable by the processor to receive, a three-dimensional (3D) volume and generate, via a volume predictor of the end-to-end trained hybrid neural network, a volume prediction.

16. The computer program product of claim 14, further comprising program code executable by the processor to calculate a final loss based on a weighted sum of the 2D prediction loss and the 3D prediction loss.

17. The computer program product of claim 12, further comprising program code executable by the processor to concatenate the slice features to generate the 3D feature volume.

18. The computer program product of claim 12, wherein the annotated 3D volume comprises a 3D medical image containing an annotated object.

* * * * *